(12) United States Patent
Anquetil et al.

(10) Patent No.: US 8,778,504 B2
(45) Date of Patent: Jul. 15, 2014

(54) PAPER COATING COMPOSITION, PAPER COATED THEREWITH AND METHOD FOR PRODUCING COATED PAPER

(75) Inventors: Jean Yves Anquetil, Pierrefonds (FR); Damien Corpet, Oslon (FR)

(73) Assignee: Clariant Production (France), Trosley Breuil (FR)

( * ) Notice: Subject to any disclaimer, the term of this patent is extended or adjusted under 35 U.S.C. 154(b) by 0 days.

(21) Appl. No.: 13/698,836

(22) PCT Filed: May 19, 2011

(86) PCT No.: PCT/EP2011/002497
§ 371 (c)(1),
(2), (4) Date: Nov. 19, 2012

(87) PCT Pub. No.: WO2011/147549
PCT Pub. Date: Dec. 1, 2011

(65) Prior Publication Data
US 2013/0071679 A1    Mar. 21, 2013

(30) Foreign Application Priority Data

May 25, 2010    (EP) .................................... 10305553

(51) Int. Cl.
*B32B 23/04*    (2006.01)
(52) U.S. Cl.
USPC ......... 428/532; 428/537.5; 427/391; 526/319
(58) Field of Classification Search
USPC .................. 428/532, 537.5; 427/391; 526/319
See application file for complete search history.

(56) References Cited

U.S. PATENT DOCUMENTS

| | | | |
|---|---|---|---|
| 3,642,774 A | 2/1972 | Schobinger et al. | |
| 3,903,035 A | 9/1975 | Affeldt et al. | |
| 4,258,104 A * | 3/1981 | Lee et al. ..................... | 428/342 |
| 5,015,711 A * | 5/1991 | Simonet et al. .............. | 526/301 |
| 5,395,440 A | 3/1995 | Trouve | |
| 5,401,562 A | 3/1995 | Akao | |
| 2005/0191449 A1 | 9/2005 | Funato et al. | |

FOREIGN PATENT DOCUMENTS

DE    2 250 977 A1    4/1974
WO    WO2004/025026    *    3/2004

OTHER PUBLICATIONS

International Search Report dated Jul. 4, 2011, issued in Application No. PCT/EP2011/002497.
International Preliminary Report on Patentability dated Nov. 27, 2012, issued in Application No. PCT/EP2011/002497.

* cited by examiner

*Primary Examiner* — Lesek Kiliman
(74) *Attorney, Agent, or Firm* — Miles & Stockbridge, PC

(57) ABSTRACT

This invention relates to a paper coating composition for enhancing the stiffness of paper or paperboard, comprising an alkali soluble polymer prepared by polymerization of at least one monomer A and at least one monomer B, wherein monomer A is selected from the following group:
  acrylic acid alkyl esters,
  methacrylic acid alkyl esters
  styrene, methyl styrene,
  acrylonitrile,
  vinyl acetate.
  2 hydroxy alkyl acrylate,
and monomer B is selected from the following group:
  acrylic acid,
  methacrylic acid,
  itaconic acid
  (meth)acrylamide.

24 Claims, No Drawings

PAPER COATING COMPOSITION, PAPER COATED THEREWITH AND METHOD FOR PRODUCING COATED PAPER

The present invention provides embodiments of paper coating compositions, coated paper and/or paperboard, and methods for forming coated paper and/or paperboard with the paper coating compositions.

A major driving force in paper technology development is the reduction in cost of paper production. A primary material cost in the paper production process is wood fiber, the cost of which is increasing rapidly. Reducing fiber usage is difficult, as paper properties are tightly coupled to the amount of fiber. Advances in coating formulation design have begun to show how coatings may be designed for fiber replacement without sacrificing paper properties. Both pigment and binder influence coating mechanical properties. Pigment shapes and sizes, and binder types and amounts are all relevant variables.

Recent trends in papermaking show that papers, both coated and uncoated, have become brighter, bluer and lighter in basis weight.

Paper coating compositions that contain high levels of hollow polymeric pigments in order to improve optical and mechanical features of the coated paper have for instance been described by WO 2008/156519 describes. Moreover WO 2004/025026 refers to a three layer paper, wherein the central core has been made with cellulose and bulked with a bulking agent, such as a diamide salt.

This trend to improve the features of papers is expected to continue in the foreseeable future; as fiber costs have increased significantly and papermakers are struggling to improve quality while maintaining costs. An interesting area of development work is fiber reduction while keeping optical and surface properties the same. Typically, replacement of fiber in uncoated paper is achieved with pigments either as filler or in pigmented sizing formulations. However, when pigments are added to the paper at the expense of fiber there is almost always a penalty in terms of paper stiffness.

Paper-based product such as paper and paperboard is typically coated to enhance its surface properties. Paper coating often requires complex and expensive equipment and is typically performed off-line from a papermaking process. As a result, the coating step adds a significant cost to production process of paper. Coating weights from about 20-40 g/m$^2$ are typically demanded to substantially enhance surface properties of the paper. Such high coat weight level is usually required because lower coating weights are typically not uniform enough to provide the desired improvement in surface properties. This relatively high coat weight not only substantially increases the production cost of paper, but also raises the basis weight of the paper and thus the shipping cost of paper.

In producing a coated paper, the coating is first applied over a base paper, and then the coated base paper is consolidated in a calendering operation to make it more suitable for printing. Calendering affects the surface, as well as the whole paper structure, of a coated paper in many ways. For example, it reduces the roughness of the paper. Coated paper roughness depends particularly on the deformation of the fiber network during calendering. A decrease in roughness is often accompanied by an increase in gloss. Paper gloss, which is a surface related paper property, depends mainly on the deformation of the coating layer structure in calendering.

The coating may be finished in the calendering process to a high gloss, a gloss, a dull, or a matte (not glossy) finish.

The present invention contributes paper coating compositions that provide or improved stiffness when coated on paper or paperboard. Moreover the present invention provides paper and/or paperboard with improves stiffness, having a two or three layer structure comprising a top layer, a central layer and optionally also a bottom layer, wherein the central layer is paper or paperboard, and the top and bottom layers are the hard coating layers that cover the upper and/or lower surface of the paper with minimal penetration into the paper.

The present invention therefore relates to paper coating composition for enhancing the stiffness of paper, comprising an alkali soluble polymer prepared by polymerization of at least one monomer A and at least one monomer B, wherein monomer A is selected from the following group:
- acrylic acid alkyl esters,
- methacrylic acid alkyl esters
- styrene, methyl styrene,
- acrylonitrile,
- vinyl acetate,
- 2 hydroxy alkyl acrylate, and monomer B is selected from the following group:
- acrylic acid,
- methacrylic acid,
- itaconic acid
- (meth)acrylamide.

In a preferred embodiment the alkali soluble polymer further comprises units of a monomer C.

In a preferred embodiment, the paper coating composition comprises 10 to 100 weight %, preferably 20 to 80 weight % of the alkali soluble polymer and 90 to 0, preferably 20 to 80 weight % of a further water soluble polymer.
This water soluble polymer may be selected from the following group:
Starch or modified starch, cellulosic ether, carboxy methyl cellulose, polyvinyl alcohols.

As disclosed herein the paper coating composition may include additional pigments, in an amount from 0 to 10 weight %. Such pigments are usually insoluble mineral or organic powders used as a dye to colour paper and as an additive to impart specific properties, such as bulk, porosity and opacity to the sheet. Examples for inorganic pigments include kaolin clay, talc, calcinated clay, structured clay, ground calcium carbonate, precipitated calcium carbonate, titanium dioxide, aluminium trihydrate, satin white, silica, zinc oxide, barium sulphate and mixtures thereof.

Additional ingredients may be added to the paper coating composition of this invention including surfactants dispersants, carboxymethyl cellulose, alginates, insolubilizers, corrosion inhibitors, antioxidizing agents, wetting agents, biocides, crosslinking agents such as glyoxal and melamine formaldehyde, defoamers, lubricating acids such as calcium stearate, sodium stearate, zinc stearate, polyethylene wax, polyethylene glycol, and bis stearamide wax, optical brighteners and carriers for optical brighteners. Various cosolvents which are miscible with water may also be added.

The rheology of the paper coating composition can vary widely as is known in the art, depending on the result desired. The solid content of the paper coating composition is preferably in the range of 5 to 30 weight %. In particular preferred are solid levels of 7 to 18 weight %, most preferred are solids levels of 8 to 15 weight %. High solids paper coating compositions are generally preferred for high speed coating as coating speed is often limited by the ability to remove water during the drying of the coated paper.

The paper coating compositions can provide the coated paper and/or paperboard with a wide variety of desirable features, while minimizing compaction (i.e., permanent deformation) of the underlying base paper. As a result, embodiments of the present disclosure can provide coated papers and/or paperboards with improved stiffness.

As used herein, "paper and/or paperboard" refers to a base paper of an amalgamation of fibers that can include, at least in part, vegetable and/or wood fibers, such as cellulose, hemicelluloses, lignin and/or synthetic fibers. As appreciated, other components can be included in the base paper composition of the paper and/or paperboard. The paper and/or paperboard, as used herein, differ in their thickness, strength and/or weight, but are both intended to be modified by the embodiments of the paper coating compositions and methods provided herein to form the coated paper and/or paperboard. For improved readability, the phrase "paper and/or paperboard" is replaced herein with the term "paper", with the recognition that "paper" encompasses both paper and/or paperboard unless such a construction is clearly not intended as will be clear from the context in which this term is used.

Embodiments of the present disclosure include a coated paper having a base paper (central layer) and a coating formed from the paper coating composition of the present disclosure (top and/or bottom layer).

The paper coating composition of the present invention is applied onto at least one of first and/or second surfaces of the base paper, to form a top and/or bottom layer coating.

The coating composition of the instant invention provides coated paper with improved stiffness of the underlying base paper. The stiffness of the paper or paperboard coated with the instant coating composition is improved by at least 18%, preferably at least 20% compared to the uncoated paper.

The coating compositions according to the instant invention comprise polymers with a high $T_g$, which are synthesized by polymerization in emulsion and which are soluble in water when the pH of the product is increased. Such products are known under the name Alkali-Soluble-Emulsions (ASE) and have been used usually as thickeners.

ASE are carboxyl functional copolymers produced by free-radical polymerization of ethylenically unsaturated monomers. The copolymers are substantially insoluble in water at low pH, but exhibit thickening on swelling properties or dissolution in aqueous media at higher degrees of ionization.

Surprisingly it has now been discovered, that by modification of the backbone of this type of polymer the $T_g$ can be increased and those polymers exhibit the property to increase the stiffness of paper significantly when coated thereon. The paper coating composition according to the instant invention comprises an alkali soluble copolymer comprising 40-80 weight % units of a first monomer A selected from $C_2$-$C_{10}$ esters of (meth)acrylic acid, acrylonitrile, styrene or methyl styrene, vinyl acetate or 2-hydroxy alkylacetate, and comprising 20-60 weight units of a second monomer B selected from the group of acrylic acid, methacrylic acid, itaconic acid, acrylamide or methacryl amide, and optionally comprising 0.1-5 weight % units of a third monomer C selected from the group comprising glycidyle methacrylate,
N-hydroxy ethyl (meth)acrylamide,
dimethacrylate monomers as 1,4-butylene glycol dimethacrylate, 1,3-butylene glycol dimethacrylate, ethylene glycol dimethacrylate, di-ethylene glycol dimethacrylate, propylene glycol dimethacrylate, di-propylene glycol dimethacrylate, 4-methyl-1,4-pentanediol dimetacrylate,
divinyl benzene or trivinyl benzene, wherein the copolymer is an emulsion polymer and has a final transition temperature $T_g$ of >80° C., preferably ≥100° C., particularly preferred in the range from 100-170° C., particularly preferred in the range from 120-150° C.

As used herein, the term "(meth)arylate" denotes both "acrylate" and "methacrylate" and the term "(meth)acrylic" denotes both "acrylic" and "methacrylic".

In a preferred embodiment the monomer A is selected from methyl, ethyl, butyl, isobutyl, propyl, octyl, decyl, 2 ethyl hexyl esters of acrylic acid and/or methyl, ethyl, butyl, isobutyl, propyl, octyl, decyl, 2 ethyl hexyl of methacrylic acid esters.

In a particular further preferred embodiment of the invention the monomer A and B are selected from methyl methacrylate or styrene for A and (meth)acrylic acid for B.

In further preferred embodiment the paper coating composition comprised 45 to 75 weight % units of at least one monomer A, 25-55 weight % units of monomer B and 0-5 weight % units of monomer C.

The instant invention also refers to a method of producing a coated paper or paperboard comprising: coating at least one side of a base paper with a coating composition comprising an alkali soluble polymer prepared by polymerization of at least one monomer A and at least one monomer B, and optionally a further monomer C, to produce a coat on it.

The alkali soluble polymer may be prepared by various processes known in the art including solution, suspension and emulsion polymerization. A preferred process is aqueous emulsion polymerization which may require the use of one or more surfactants for emulsifying the monomers and for maintaining the polymer obtained in a stable, dispersed condition. Suitable surfactants include anionic, nonionic surfactants and mixtures thereof, using from 0.1 to 10 weight % of surfactant based on the weight of total monomers.

Suitable anionic dispersing agents include, for example, alkali fatty alcohol sulfates, such as sodium lauryl sulfate; arylalkyl sulfonates, such as potassium isopropylbenzene sulfonate; alkali alkyl sulfosuccinates, such as sodium octyl sulfosuccinate; and alkali arylalkylpolyethoxyethanol sulfates or sulfonates, such as sodium t-octylphenoxypolyethoxyethyl sulfate, having 1 to 30 oxyethylene units.

Suitable nonionic dispersing agents include, for examples, alkyl phenoxypolyethoxyethanols, having alkyl groups of from 7 to 18 carbon atoms and from 6 to 60 oxyethylene units such as for example, heptyl phenoxypolyethoxyethanols; ethylene oxide derivatives of long chained carboxylic acids such as lauric acid, myristic acid, palmitic acid, oleic acid or mixtures of acids such as those found in tall oil containing from 6 to 60 oxyethylene units; ethylene oxide condensates of long chained alcohols such as octyl, decyl, lauryl or cetyl alcohols containing from 6 to 60 oxyethylene units; ethylene oxide condensates of long-chain or branched chain amines such as dodecyl amine, hexadecylamine, and octadecyl amine, containing from 6 to 60 oxyethylene units; and block copolymers of ethylene oxide sections combined with one or more hydrophobic propylene oxide sections.

High molecular weight polymers such as starch, hydroxyethyl cellulose, methyl cellulose, polyacrylic acid, polyvinyl alcohol, may be used as emulsion stabilizers and protective colloids.

For the embodiments of the present disclosure, the paper coating composition is applied over at least one of a first and/or a second major surface of a base paper before an eventual calendering process. The base paper can be a dried amalgamation of fibers that can include, at least in part, vegetable and/or wood fibers, such as cellulose, hemicelluloses, lignin and/or synthetic fibers. As appreciated, other components can be included in the base paper composition of the paper and/or paperboard.

The paper coating composition can be applied to the base paper using a number of different coating techniques.

Examples of these techniques include rod, grooved rod, curtain coating, stiff blade, applicator roll, fountain, jet, short dwell, slotted die, bent blade, bevel blade, air knife, bar, gravure, size press (conventional or metering), spray application techniques. Other coating techniques are also possible.

In one embodiment, one or more layers of the paper coating composition are applied on at least one side of the base paper. In one embodiment one or more layers of the paper coating composition are applied using a film press, or rod and/or a stiff blade coating technique. In one embodiment, the total dried coat weight applied is about 1 to about 30 g/m$^2$, and in an additional embodiment about 2 to about 20 g/m$^2$, especially preferred 3 to 10 g/m$^2$.

In one embodiment, the coating can be applied to both sides of the base paper to ensure that the printed images on both sides of the printing sheet are of comparable quality. In one embodiment, the paper coating composition can be applied as a single layer to the base paper.

In one preferred embodiment the coating has a thickness in the range from 0.1 to 30 μm, in particular 1 to 10 μm.

The layer(s) of the paper coating composition is then dried. Drying of the paper coating composition can be accomplished by convention, conduction, radiation and/or combinations thereof.

In addition, the coated paper can also include a base coat between the base paper and the coating of the present disclosure. As used herein, a "base coat" refers to a pigmented or unpigmented base coat that can lay under the paper coating composition of the present disclosure and can include a binder.

The base coat layer is applied to the base paper prior to the application of the paper coating composition. The base coat layer is applied in a similar manner as the paper coating composition as described herein, and may be applied in one or more layers.

The base paper with its coating of the paper coating composition can then be calendered. As used herein, "calendered" refers to a wide range of different operations in which multiple rolls are used to process the coated paper through one or more nips. Examples of such on or off machine calendering processes can include, but are not limited to, single-nip calendering, hot/soft calendering, multi-nip calendering, extended nip calendering and super calendering processes. The rolls of the calender can be made of a variety of materials. For example, the rolls can be formed of metal (e.g., steel), have a polymeric covering and/or a cotton covering, where the different rolls can each having different diameters and optional coverings.

As appreciated, the effect of calendering processes on the coated paper properties depends on the temperature of the roll surfaces, the running speed, the elastic properties of the rolls and the linear load between the rolls, among others.

The operating temperature ranges from about 20-300° C. In an additional embodiment the operating roll temperature can be from 90° C. to about 150° C. (i.e. where no heat is added to the rolls of the calendering process). So, during a calendering process the coating formed from the paper coating composition can undergo permanent deformation, while the base paper undergoes minimal, if any, compaction (i.e., permanent deformation) during the calendering process. As a result, the strength properties of the base paper can be essentially retained while still achieving the desired paper surface properties (e.g., gloss and smoothness) from the calendering process.

Because the coating formed from the paper coating composition is so highly compressible relative to the base paper, there is a greater flexibility in the operating conditions of the calendering process (e.g., the nip pressure, calender operating temperature, type of calender, calendering speed, roll hardness) in achieving the desired coated paper features (e.g., smoothness, stiffness, bulk, gloss, etc.)

The paper coating composition may be applied to various substrates including paper such as freesheet and groundwood grades; paper board; labels; paper products used for newspapers, advertisements, poster, books or magazines; and building substrates such as wall paper, wall board or ceiling tile.

EXAMPLES

The stiffness test has been carried out with a Lorenzen & Wettre Bending Tester (electricity of 110-240 V AC), dry supply of compressed air (4 bars).

Definitions used:
Resistance (bending resistance): Bending resistance is the strength measured at a deflection. The readings are in units of Nm.
Stiffness: The stiffness of paper is its ability to resist an applied bending force. Stiffness are given in mNm.
Bending stiffness is calculated with bending resistance. Values are automatically calculated with the device.

$$S_b = 60 * F * L^2 / \pi * a * b$$

$S_b$=Bending stiffness, mNm
F=Bending force, N
L=Bending length, mm
a=Bending angle, degrees
b=Sample width, mm Comparative Example 1

Starch

In a 2 l-reactor with stirrer and reflux condenser was charged with 1500 g of deionised water and 500 g of a native starch. The pH was adjusted to 7, 0.4 g of enzyme (amylase) is added and this initial charge was heated to 80° C., under stirring for 15 minutes.

The temperature was then increased to 90° C. and 6 g of ZnSO$_4$ solution at 10% were added to stop enzyme action.

This starch solution was then diluted to 16%.

The characterization of the resultant solution in term of solid content (SC) is given below:
SC=16%

Comparative Example 2

Standard Styrene Acrylic Copolymer with $T_g$ about 60° C.

In a 2 l-reactor with stirrer and reflux condenser was charged with 433 g of deionised water and 3 g of a surfactant solution (lauryl sulphate at 30%) and this initial charge was heated to 80° C., under nitrogen atmosphere, with stirring.
Feed Stream I:
5 g of ammonium peroxodisulfate,
62 g of deionised water
Feed Stream II:
583 g of Styrene,
266 g of Butyl Acrylate,
10 g of Methacrylic Acid,
11 g of surfactant solution (lauryl sulphate at 30%),
384 g of deionised water.

After an internal temperature of 80° C. had been reached, the feed stream I and feed stream II were metered continuously over the course of 4 hours, beginning simultaneously, into the polymerization batch via two separated feed ports, this addition taking place with stirring and with retention of the reaction temperature. 235 g of deionised water were used to rinse the pumps. After the end of both feed streams, reaction was allowed to continue at reaction temperature for 25 minutes. Subsequently the reaction mixture was cooled to room temperature and filtered through a filter having a mesh size of 160 µm.

The characterization of the resultant copolymer in term of solid content (SC) and Glass transition Temperature ($T_g$) is given below:
SC=44%
$T_g$=60° C.

Comparative Example 3

Methyl Methacrylate Homopolymer, Final $T_g$=about 120° C.

In a 2 l-reactor with stirrer and reflux condenser was charged with 740 g of deionised water and 419 g of a 25% solution of styrene-acrylic acid copolymer, and this initial charge was heated to 85° C., under nitrogen atmosphere, with stirring.
Feed Stream I:
385 g of Methyl Methacrylate
Feed Stream II:
1.9 g of ammonium peroxodisulfate
136 g of deionised water After an internal temperature of 85° C. had been reached, the feed stream I and feed stream II were metered continuously over the course of 3 h 30, beginning simultaneously, into the polymerization batch via two separated feed ports, this addition taking place with stirring and with retention of the reaction temperature. 318 g of deionised water were used to rinse the pumps. After the end of both feed streams, reaction was allowed to continue at reaction temperature for 25 minutes. Subsequently the reaction mixture was cooled to room temperature and filtered through a filter having a mesh size of 160 µm.

The characterization of the resultant homopolymer in term of solid content (SC) and Glass transition Temperature ($T_g$) is given below:
SC=25%
$T_g$=120° C.

Comparative Example 4

Styrene Homopolymer, Final $T_g$=about 120° C.

In a 2 l-reactor with stirrer and reflux condenser was charged with 740 g of deionised water and 419 g of a 25% solution of styrene-acrylic acid copolymer, and this initial charge was heated to 85° C., under nitrogen atmosphere, with stirring.
Feed Stream I:
385 g of Styrene
Feed Stream II:
1.9 g of ammonium peroxodisulfate
136 g of deionised water After an internal temperature of 85° C. had been reached, the feed stream I and feed stream II were metered continuously over the course of 3 h 30, beginning simultaneously, into the polymerization batch via two separated feed ports, this addition taking place with stirring and with retention of the reaction temperature. 318 g of deionised water were used to rinse the pumps. After the end of both feed streams, reaction was allowed to continue at reaction temperature for 25 minutes. Subsequently the reaction mixture was cooled to room temperature and filtered through a filter having a mesh size of 160 µm.

The characterization of the resultant homopolymer in term of solid content (SC) and Glass transition Temperature (Tg) is given below:
SC=25%
$T_g$=120° C.

Comparative Example 5

Soluble Acrylic Copolymer with $T_g$=60° C.

In a 2 l-reactor with stirrer and reflux condenser was charged with 735 g of deionised water and 45 g of a surfactant solution (lauryl sulphate at 30%) and this initial charge was heated to 75° C., under nitrogen atmosphere, with stirring.
Feed Stream I:
1.6 g of ammonium peroxodisulfate
14 g of deionised water
Feed Stream II:
0.2 g of sodium metabisulfite
9 g of deionised water
Feed Stream III:
407 g of Ethyl Acrylate,
176 g of Methacrylic Acid,
20 g of surfactant solution (lauryl sulphate at 30%)
272 g of deionised water.

After an internal temperature of 75° C. had been reached, the feed stream I and feed stream II were added in the reactor and, then, the feed stream III was metered continuously over the course of 3 h 30, beginning into the polymerization batch, this addition taking place with stirring and with retention of the reaction temperature. 320 g of deionised water were used to rinse the pumps. After the end of both feed streams, reaction was allowed to continue at reaction temperature for 25 minutes. Subsequently the reaction mixture was cooled to room temperature and filtered through a filter having a mesh size of 160 µm.

The characterization of the resultant copolymer in term of solid content (SC) and Glass transition Temperature ($T_g$) is given below:
SC=29%
$T_g$=60° C.

Example 1

Soluble Methyl Methacrylate Based Copolymer with $T_g$=100° C.

In a 2 l-reactor with stirrer and reflux condenser was charged with 892 g of deionised water and 16 g of lauryl sulphate and this initial charge was heated to 75° C., under nitrogen atmosphere, with stirring.
Feed Stream I:
1.8 g of ammonium peroxodisulfate
15 g of deionised water
Feed Stream II:
0.2 g of sodium metabisulfite
10 g of deionised water
Feed Stream III:
107 g of Ethyl Acrylate,
204 g of Methacrylic Acid,
360 g of Methyl Methacrylate,
6 g of lauryl sulphate,
330 g of deionised water.

After an internal temperature of 75° C. had been reached, the feed stream I and feed stream II were added in the reactor and, then, the feed stream III was metered continuously over the course of 3 h 30, beginning into the polymerization batch, this addition taking place with stirring and with retention of the reaction temperature. 47 g of deionised water were used to rinse the pumps. After the end of both feed streams, reaction was allowed to continue at reaction temperature for 25 minutes. Subsequently the reaction mixture was cooled to room temperature and filtered through a filter having a mesh size of 160 μm.

The characterization of the resultant copolymer in term of solid content (SC) and Glass transition Temperature ($T_g$) is given below:
SC=35%
$T_g$=105° C.

Example 2

Soluble Methyl Methacrylate Based Copolymer with $T_g$=120° C.

In a 2 l-reactor with stirrer and reflux condenser was charged with 892 g of deionised water and 16 g of lauryl sulphate and this initial charge was heated to 75° C., under nitrogen atmosphere, with stirring.
Feed Stream I:
1.8 g of ammonium peroxodisulfate
15 g of deionised water
Feed Stream II:
0.2 g of sodium metabisulfite
9 g of deionised water
Feed Stream III:
54 g of Ethyl Acrylate,
204 g of Methacrylic Acid,
421 g of Methyl Methacrylate,
6 g of lauryl sulphate,
334 g of deionised water.

After an internal temperature of 75° C. had been reached, the feed stream I and feed stream II were added in the reactor and, then, the feed stream III was metered continuously over the course of 3 h 30, beginning into the polymerization batch, this addition taking place with stirring and with retention of the reaction temperature. 47 g of deionised water were used to rinse the pumps. After the end of both feed streams, reaction was allowed to continue at reaction temperature for 25 minutes. Subsequently the reaction mixture was cooled to room temperature and filtered through a filter having a mesh size of 160 μm.

The characterization of the resultant copolymer in term of solid content (SC) and Glass transition Temperature ($T_g$) is given below:
SC=35%
$T_g$=120° C.

Example 3

Soluble Styrene Based Copolymer with $T_g$=120° C.

In a 2 l-reactor with stirrer and reflux condenser was charged with 890 g of deionised water and 16 g of lauryl sulphate and this initial charge was heated to 75° C., under nitrogen atmosphere, with stirring.
Feed Stream I:
1.8 g of ammonium peroxodisulfate
15 g of deionised water
Feed Stream II:
0.2 g of sodium metabisulfite
10 g of deionised water
Feed Stream III:
50 g of Ethyl Acrylate,
200 g of Methacrylic Acid,
420 g of Styrene,
6 g of lauryl sulphate,
330 g of deionised water.

After an internal temperature of 75° C. had been reached, the feed stream I and feed stream II were added in the reactor and, then, the feed stream III was metered continuously over the course of 3 h 30, beginning into the polymerization batch, this addition taking place with stirring and with retention of the reaction temperature. 46 g of deionised water were used to rinse the pumps. After the end of both feed streams, reaction was allowed to continue at reaction temperature for 25 minutes. Subsequently the reaction mixture was cooled to room temperature and filtered through a filter having a mesh size of 160 μm.

The characterization of the resultant copolymer in term of solid content (SC) and Glass transition Temperature ($T_g$) is given below:
SC=35%
$T_g$=120° C.

Example 4

Soluble Methyl Methacrylate Based Copolymer with $T_g$=150° C.

In a 2 l-reactor with stirrer and reflux condenser was charged with 892 g of deionised water and 16 g of lauryl sulphate and this initial charge was heated to 75° C., under nitrogen atmosphere, with stirring.
Feed Stream I:
1.8 g of ammonium peroxodisulfate
15 g of deionised water
Feed Stream II:
0.2 g of sodium metabisulfite
10 g of deionised water
Feed Stream III:
26 g of Ethyl Acrylate,
204 g of Methacrylic Acid,
448 g of Methyl Methacrylate,
6 g of lauryl sulphate,
330 g of deionised water.

After an internal temperature of 75° C. had been reached, the feed stream I and feed stream II were added in the reactor and, then, the feed stream Ill was metered continuously over the course of 3 h 30, beginning into the polymerization batch, this addition taking place with stirring and with retention of the reaction temperature. 47 g of deionised water were used to rinse the pumps. After the end of both feed streams, reaction was allowed to continue at reaction temperature for 25 minutes. Subsequently the reaction mixture was cooled to room temperature and filtered through a filter having a mesh size of 160 μm.

The characterization of the resultant copolymer in term of solid content (SC) and Glass transition Temperature ($T_g$) is given below:
SC=35%
$T_9$=149° C.

Example 5

Soluble Methyl Methacrylate Based Copolymer with $T_g=150°$ C.+Starch, 50/50

The starch solution of the comparative example n° 1 is diluted to a final solid content of 12%.

The polymer dispersion of example 4 is solubilized and diluted to a final solid content of 12%

These 2 solutions are mixed together with a ratio of 50/50.

The characterization of the resultant solution in term of solid content (SC) is given below:

SC=12%

The table 1 gives Characteristics of the products.

| Example | Polymer | $T_g$ [° C.] | Solid content [%] |
|---|---|---|---|
| Comp. Ex. 1 | Starch | | |
| Com. Ex. 2 | Standard styrene acrylic copolymer | 60 | 44 |
| Comp. Ex. 3 | Methyl methacrylate homopolymer | 120 | 25 |
| Comp. Ex. 4 | Styrene homopolymer | 120 | 25 |
| Comp. Ex. 5 | Soluble acrylic copolymer | 60 | 29 |
| 1 | Soluble methyl methacrylate based copolymer | 100 | 35 |
| 2 | Soluble methyl methacrylate copolymer | 120 | 35 |
| 3 | Soluble styrene based copolymer | 120 | 35 |
| 4 | Soluble methyl methacrylate copolymer | 150 | 35 |
| 5 | Soluble methyl methacrylate based copolymer + Starch | 150 | 12 |

The table 2 gives composition of the coating applied on the base paper.

Application Examples

All the polymers described before have been applied on paper surface, after neutralization with caustic soda and dilution (in the following ratio):

| Application examples | Product | Polymer of the Example [g] | Water [g] | Starch at 16% [g] | Dry Content of the coating [%] |
|---|---|---|---|---|---|
| A | Comp. Ex. 1 | | | 200 | 16 |
| B | Comp. Ex. 2 | 90 | 110 | | 20 |
| C | Comp. Ex. 3 | 120 | 80 | | 15 |
| D | Comp. Ex. 4 | 120 | 80 | | 15 |
| E | Comp. Ex. 5 | 56 | 144 | | 8 |
| F | Ex. 1 | 46 | 154 | | 8 |
| G | Ex. 2 | 54 | 146 | | 9 |
| H | Ex. 3 | 54 | 146 | | 9 |
| I | Ex. 4 | 46 | 154 | | 8 |
| J | Ex. 5 | 35 | 90 | 75 | 12 |

The table 3 gives the stiffness improvement which is the improvement measured in comparison to uncoated paper. (At a dosage of 1 gram of treatment by m²)

| Application examples | A | B | C | D | E | F | G | H | I | J |
|---|---|---|---|---|---|---|---|---|---|---|
| Stiffness improvement [%] | +16 | +6 | +7 | +6 | +5 | +20 | +30 | +29 | +42 | +30 |

The invention claimed is:

1. A paper coating composition for enhancing the stiffness of paper or paperboard, comprising an alkali soluble polymer prepared by polymerization of at least one monomer A and at least one monomer B, wherein monomer A is selected from the group consisting of:
    acrylic acid alkyl esters,
    methacrylic acid alkyl esters
    styrene, methyl styrene,
    acrylonitrile,
    vinyl acetate and
    2 hydroxy alkyl acrylate,
and monomer B is selected from the group consisting of:
    acrylic acid,
    methacrylic acid,
    itaconic acid, and
    (meth)acrylamide,
wherein the paper coating composition comprises 10 to 100 weight % of the alkali soluble polymer and 90 to 0 weight % of a further water soluble polymer, and wherein the further water soluble polymer is starch, cellulosic ether, carboxy methyl cellulose or polyvinylalcohol.

2. A paper coating composition according to claim 1, wherein the alkali soluble polymer optionally comprises further units of a monomer C, selected from the group consisting of:
    glycidyle methacrylate,
    N-hydroxy ethyl (meth)acrylamide,
    dimethacrylate monomers, and
    divinyl benzene, trivinyl benzene.

3. A paper coating composition according to claim 1, wherein the at least one monomer A is selected from the group consisting of methyl, ethyl, butyl, isobutyl, propyl, octyl, decyl, 2 ethyl hexyl esters of acrylic acid, methyl, ethyl, butyl, isobutyl, propyl, octyl, decyl, 2 ethyl hexyl of methacrylic acid esters and a combination thereof.

4. A paper coating composition according to claim 1, wherein the at least one monomer A is methyl methacrylate or styrene, and the at least one monomer B is acrylic acid or methacrylic acid.

5. A paper coating composition according to claim 1, wherein the alkali soluble polymer comprises 40 to 80 weight % units of the at least one monomer A and 20 to 60 weight % units of the at least one monomer B.

6. A paper coating composition according to claim 2, wherein the alkali soluble polymer comprises 0.1 to 5 weight % of units of said at least one monomer C.

7. A paper coating composition according to claim 1, wherein the paper coating composition comprises 20 to 80 weight % of the alkali soluble polymer and 20-80% of said further water soluble polymer.

8. A paper coating composition according to claim 1, wherein the $T_g$ of the alkali soluble polymer is >80° C. and the polymer is an emulsion polymer.

9. A paper coating composition according to claim 1, wherein the $T_g$ of the alkali soluble polymer is ≥100° C. and the polymer is an emulsion polymer.

10. A paper coating composition according to claim 1, wherein the coating composition further comprises 0 to 10 weight % of at least one pigment.

11. A paper coating composition according to claim 1, wherein the solid content of the coating composition is 5% up to 30%.

12. Paper or paperboard with a three layer structure comprising:
a top layer, a central layer and a bottom layer, wherein the central layer is paper or a paperboard and the top layer and the bottom layer are a paper coating composition according to claim 1.

13. Paper or paper board according to claim 12, wherein the stiffness of the coated paper or paperboard is improved by at least 18%, compared to the uncoated paper.

14. A method of producing a coated paper or paperboard comprising:
coating at least one side of a base paper with a coating composition comprising an alkali soluble polymer comprising the step of polymerizing at least one monomer A and at least one monomer B, wherein monomer A is selected from the group consisting of:
acrylic acid alkyl esters,
methacrylic acid alkyl esters
styrene, methyl styrene,
acrylonitrile,
vinyl acetate, and
2 hydroxy alkyl acrylate,
and monomer B is selected from the group consisting of:
acrylic acid,
methacrylic acid,
itaconic acid, and
(meth)acrylamide
and optionally a further monomer C,
to produce a coat on the base paper with a weight of 1 to 30 g/m$^2$, wherein the coating has a thickness in the range from 0.1 to 30 μm.

15. A method of producing a coated paper or paperboard according to claim 14, wherein the coating is applied to both sides of the base paper.

16. A paper coating composition according to claim 2, wherein the dimethacrylate monomers are selected from the group consisting of 1,4-butylene glycol dimethacrylate, 1,3-butylene glycol dimethacrylate, ethylene glycol dimethacrylate, di-ethylene glycol dimethacrylate, propylene glycol dimethacrylate, di-propylene glycol dimethacrylate and 4-methyl-1,4-pentanediol dimethacrylate.

17. A paper coating composition according to claim 1, wherein the solid content of the coating composition is 8 to 15%.

18. Paper or paper board according to claim 14, wherein the stiffness of the coated paper or paperboard is improved by at least 20%, compared to the uncoated paper.

19. A method of producing a coated paper or paperboard according to claim 14, wherein the coat on the base layer has a weight of 2 to 20 g/m$^2$.

20. A method of producing a coated paper or paperboard according to claim 14, wherein the coat on the base layer has a weight of 3 to 10 g/m$^2$.

21. A method of producing a coated paper or paperboard according to claim 14, wherein the coating has a thickness in the range of 1 to 10 μm.

22. Paper or paperboard coated with a paper coating composition according to claim 1.

23. Paper or paperboard as claimed in claim 22, including a base coat between the paper or paperboard and the paper coating composition.

24. A paper coating composition according to claim 14, wherein the $T_g$ of the alkali soluble polymer is >80° C. and the polymer is an emulsion polymer.

\* \* \* \* \*